March 8, 1955 L. K. SANDERS ET AL Re. 23,962

AUTOMOBILE PARKING ELEVATOR

Original Filed Aug. 15, 1949 4 Sheets-Sheet 1

Leo K. Sanders
Vaughn A. Sanders
Inventors

By Fish & Richardson

March 8, 1955 L. K. SANDERS ET AL Re. 23,962

AUTOMOBILE PARKING ELEVATOR

Original Filed Aug. 15, 1949 4 Sheets-Sheet 2

Leo K. Sanders
Vaughn A. Sanders
Inventors

By Fish and Neuff

March 8, 1955 L. K. SANDERS ET AL Re. 23,962

AUTOMOBILE PARKING ELEVATOR

Original Filed Aug. 15, 1949 4 Sheets-Sheet 3

Leo K. Sanders
Vaughn A. Sanders
Inventors

By Fish and Richardson

March 8, 1955 L. K. SANDERS ET AL Re. 23,962
AUTOMOBILE PARKING ELEVATOR
Original Filed Aug. 15, 1949 4 Sheets-Sheet 4
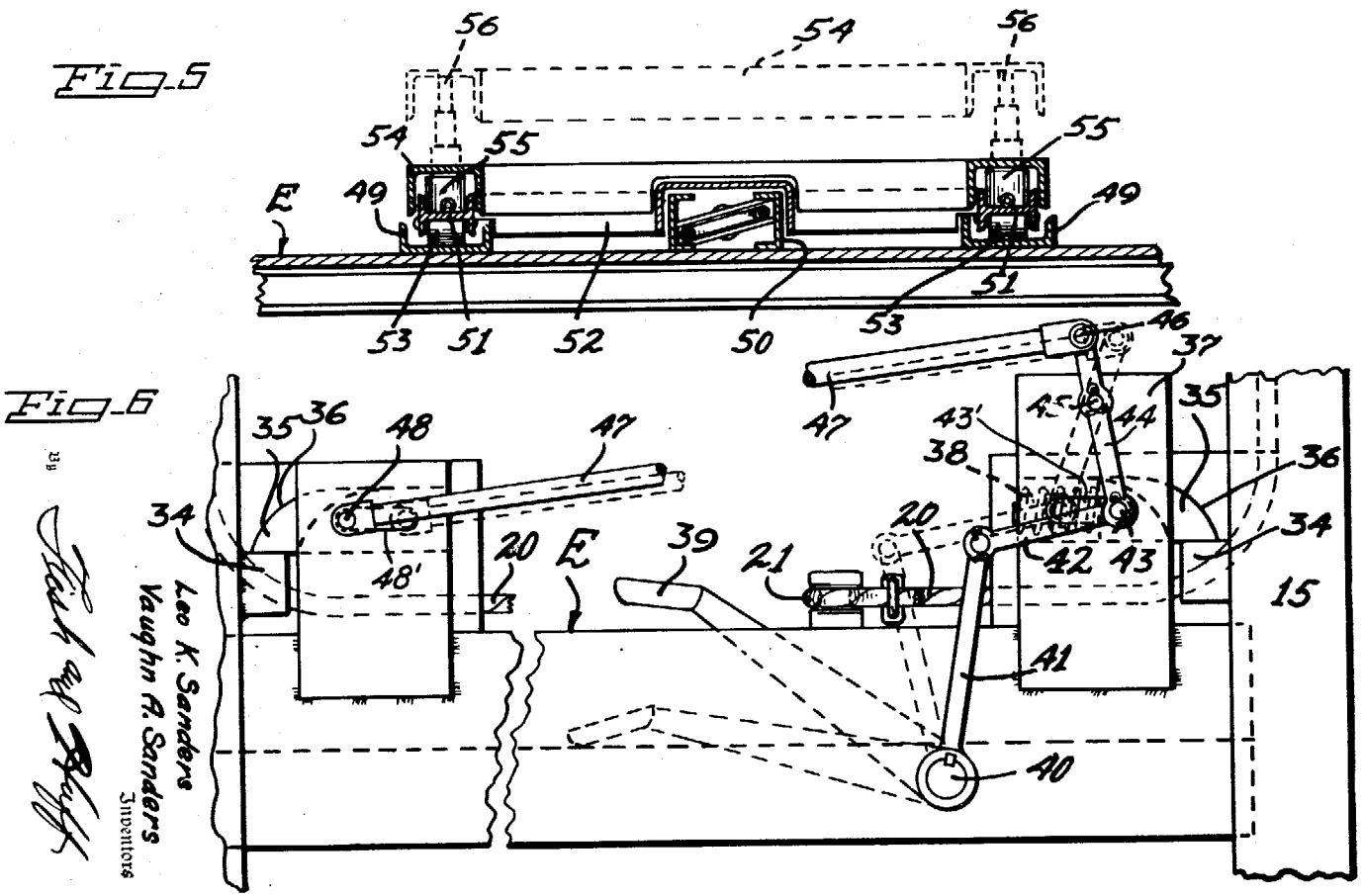

United States Patent Office

Re. 23,962

Reissued Mar. 8, 1955

23,962

AUTOMOBILE PARKING ELEVATOR

Leo K. Sanders and Vaughn A. Sanders, Spokane, Wash., assignors to Pigeon-Hole Parking, Inc., Northport, Wash.

Original No. 2,626,065, dated January 20, 1953, Serial No. 110,296, August 15, 1949. Application for reissue December 27, 1954, Serial No. 477,962

7 Claims. (Cl. 214—16.1)

Matter enclosed in heavy brackets [ ] appears in the original patent but forms no part of this reissue specification; matter printed in italics indicates the additions made by reissue.

Our present invention relates to charging and discharging apparatus in the general class of material and article handling, and more specifically to an automobile parking elevator for use *with* [in a multi-story building structure having] vertically arranged [tiers, stories, or] levels of storage facilities for [standard types of] automotive vehicles.

The power operated appliance or apparatus *though not limited thereto* is designed for service with a storage structure having two laterally spaced sections, and in intermediate drive, aisle, or railway in which the parking apparatus is propelled and operated for successively depositing incoming vehicles in selected storage spaces, at desired heights, of either section, and with equal facility the apparatus is utilized for successively withdrawing outgoing vehicles from storage and discharging them at the entrance to the parking structure.

The parking apparatus includes a wheeled-vehicle conveyor, or railway motor truck, under manual control of a riding attendant, which is adapted to receive a vehicle at the entrance of the storage structure and convey the vehicle through the aisle to a selected location. A cable-suspended elevator is mounted upon the conveyor for raising and lowering the vehicle to and from selected storage levels, and a wheeled transfer-carrier, or cable operated horizontal jack or ram is mounted upon the elevator, and movable transversely thereof, under manual control, for depositing a vehicle in a selected storage space, as well as for removing the vehicle from the storage space and depositing it upon the elevator. For removing, lowering and discharging an outgoing vehicle, the operations of the conveyor and its accessories are reversed, and the outgoing vehicle is discharged at the exit from the storage building or multi-story structure.

The invention consists in certain novel features of construction and combinations and arrangements of parts as will hereinafter be described and more particularly set forth in the appended claims.

In the accompanying drawings we have illustrated a complete example of a physical embodiment of our invention wherein the parts are combined and arranged in accord with one mode we have devised for the practical application of the principles of the invention. It will, however, be understood that changes and alterations are contemplated and may be made in these exemplifying drawings and mechanical structures, within the scope of our claims, without departing from the principles of the invention.

Figure 5 is a vertical sectional view of the transfer carrier mounted upon the elevator platform.

Figure 6 is an enlarged detail view of a portion of the elevator, showing the pedal control mechanism for the elevator.

Figure 1:
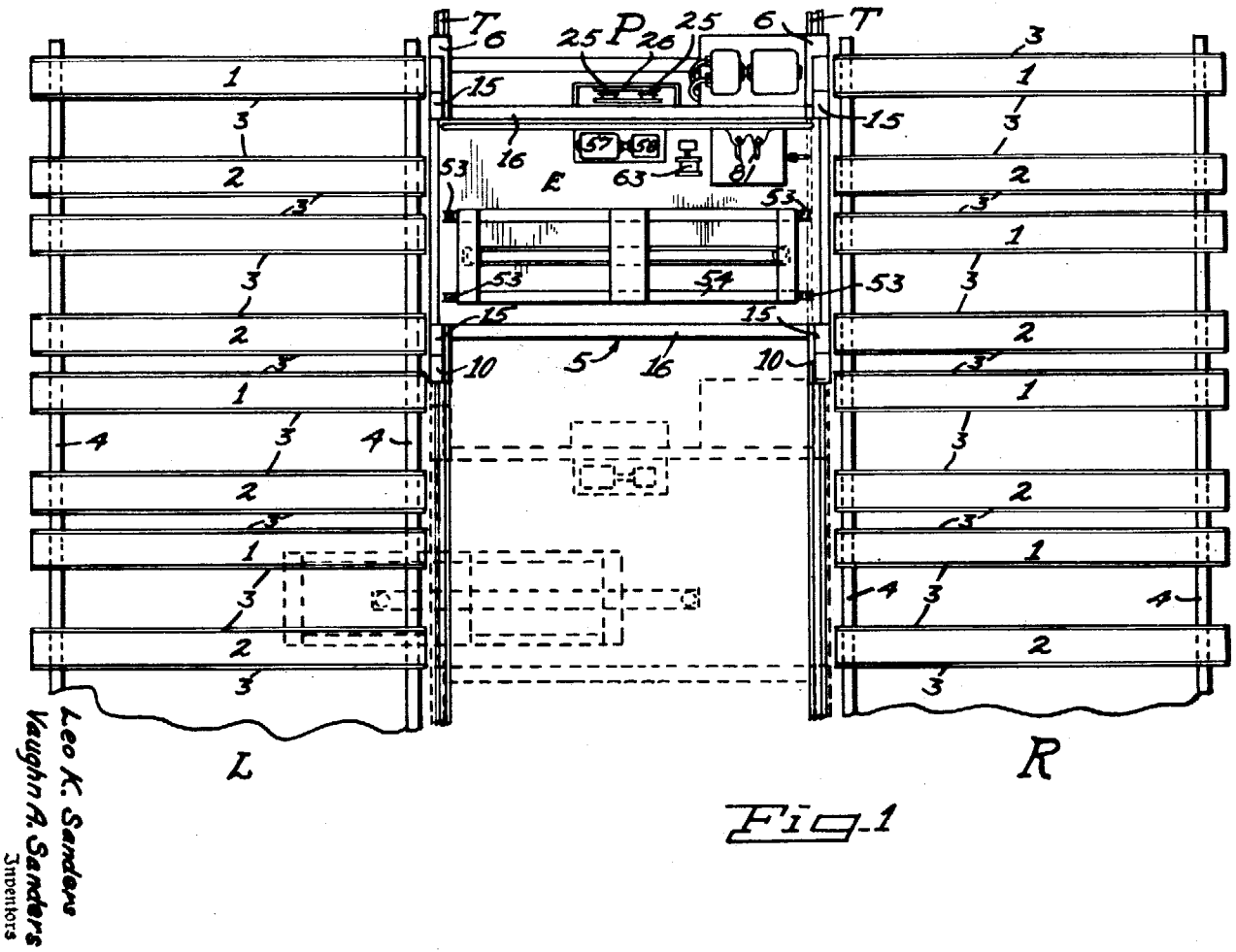
Figure 1 is a diagrammatic plan view of the sectional storage structure, showing the parking appliance of our invention in operative relation thereto.
Figure 2:
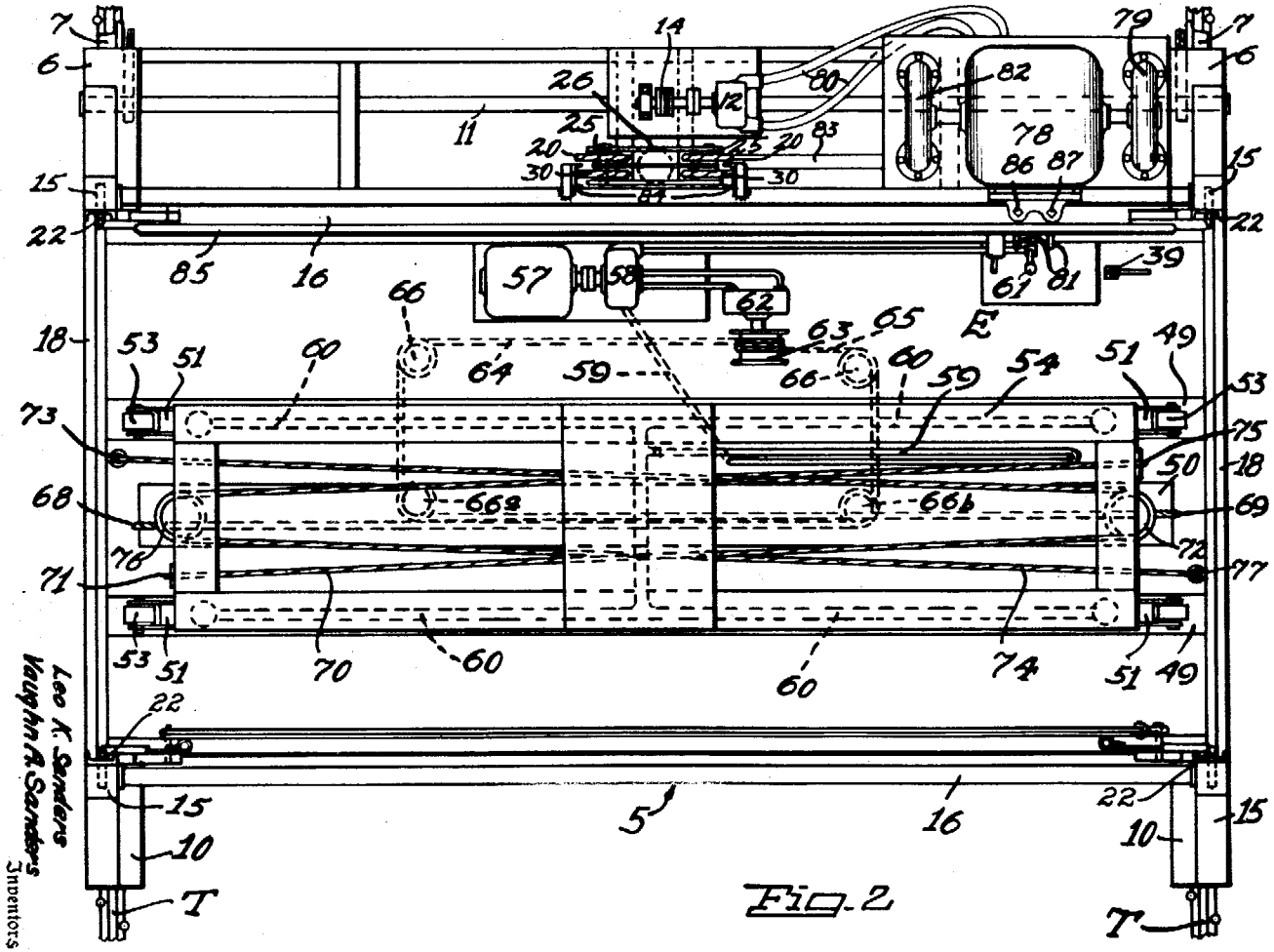
Figure 2 is an enlarged plan view of the parking facility, or apparatus.
Figures 3, 4:
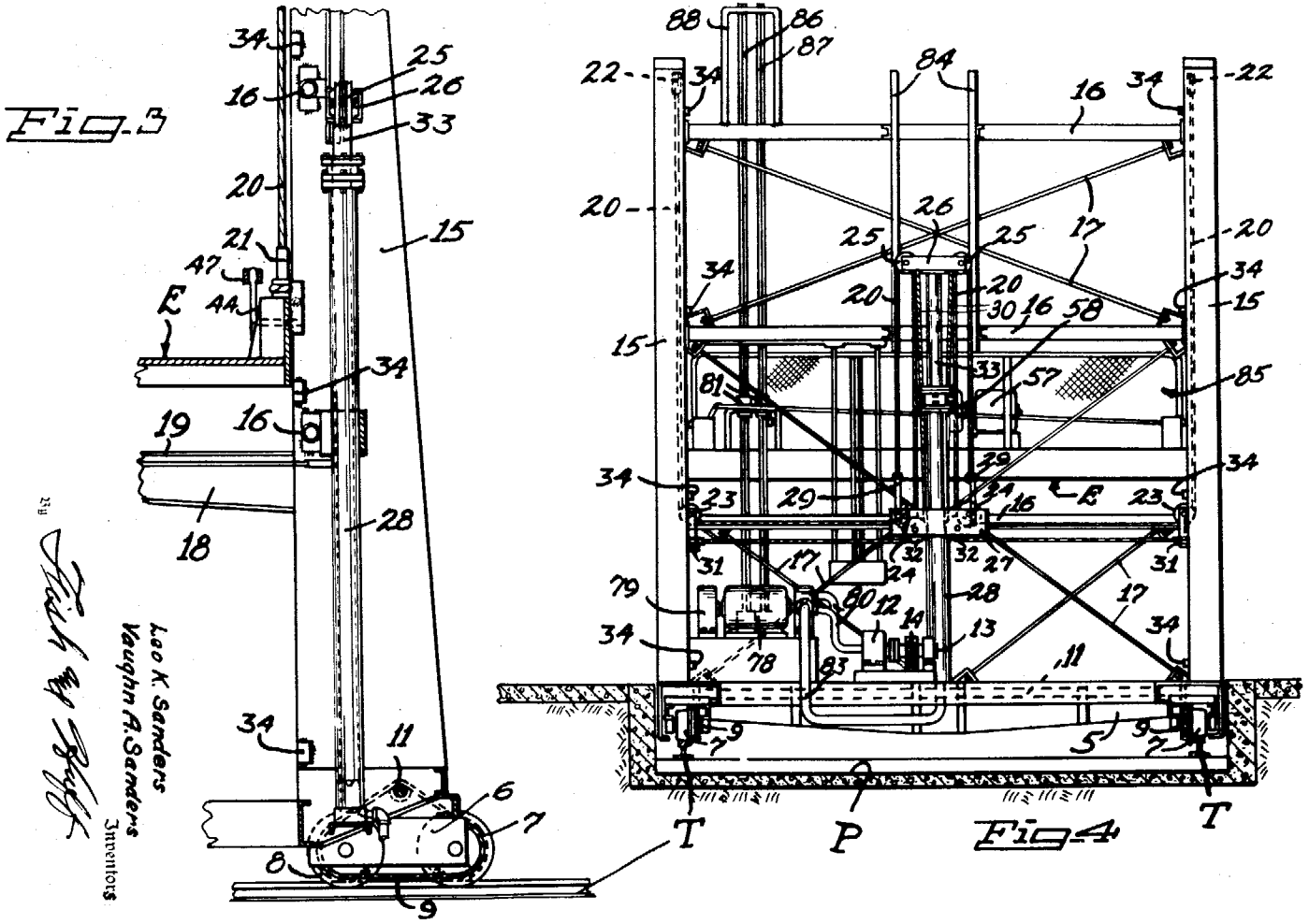
Figure 3 is a partial elevation and vertical sectional view at one corner of the apparatus.
Figure 4 is a view in end elevation of the apparatus.

In the diagram of Fig. 1, a right hand storage unit R and a left hand unit L are laterally spaced at opposite sides of an intermediate sunken aisle or pit P that is equipped with a railway track of spaced rails T fastened in usual manner as by spikes. These right and left storage sections or units are erected with tubular posts or uprights that are laterally braced, and the sections are vertically spaced to form multi-stories or levels, each level consisting of a number of storage compartments extending at right angles from or perpendicular to the center aisle of the storage structure.

Each of the storage compartments consists of two spaced parallel channel beams 1 and 2 having upper side flanges 3, and the beams are fastened on the tops of two parallel beams, as 4, 4, forming component parts of the storage building. The compartments are spaced apart, and each is adapted to receive and retain a vehicle having a length, width, and height, within a wide range of sizes and types of automotive vehicles of standard makes.

The length [,] and the height [,] of the storage structure may be varied, and the usual safety appliances for parked vehicles, and other accessories and equipment, are employed for completing the safe storage of the vehicles.

The wheeled conveyor, or railway motor truck 5 includes a horizontal and rectangular base frame, made of channel beams, and provided at its two front corners with housings as 6, in each of which is journaled a flanged driving wheel 7 and a driven wheel 8 connected by a sprocket chain drive 9, and trailer wheels are enclosed within complementary housings 10 at the rear end of the truck.

For propelling the wheeled conveyor in opposite directions on the railway track T, the truck is equipped with a transversely arranged sprocket shaft 11 that transmits power through the sprocket drive to the driving wheels. Power is transmitted to the shaft from a fluid pressure motor 12 having a shaft 13 mounted and journaled above the propulsion shaft, and a reversible chain drive 14 transmits power from shaft 13 to the propulsion shaft. The propulsion motor is manually controlled by a riding attendant as will be described.

Upon the wheeled conveyor is mounted an elevator E including a horizontal frame or platform, and for supporting and guiding the elevator the conveyor is equipped with a superstructure including four upright channel-beam posts or standards as 15, two at the rear corners of the conveyor, and two spaced a suitable distance behind the front end of the conveyor.

At the front and rear ends of the upright guide frame of the elevator a pair of top tubular beams 16 unite the pairs of posts or standards, and crossed diagonal braces 17 unite the posts between the levels of the guide frame. For uniting the lateral pairs of posts 15 side beams 18 at their opposite ends are welded to the posts and provided with horizontal channel beams 19 vertically spaced to coincide with the spaced levels or stories of the storage structure, or sections A and B.

The elevator is operated under fluid pressure by a ram or lift-motor 28 mounted in upright position on the front end of the conveyor in front of the elevator, through the use of duplex cables 20 and 30 arranged in pairs, the outer ends of the two cables 20 being attached at 21 to the elevator. From this anchorage cables 20 are led upwardly and over suspending sheaves 22 journaled at the tops of the corner posts or standards 15, and from these sheaves the cables extend downwardly to and under transversely arranged guide sheaves 23 journaled on the guide-frame of the elevator. From the sheaves 23 the cables extend inwardly and under sheaves 24, thence upwardly and over sheaves 25 journaled on the movable ram-head 26, thence downwardly to the fixed head 27 of the ram 28 where the ends of the cables are attached at 29.

The duplex pair of cables 30 are secured as at 21 to the elevator at the corners opposed to fastening of cable 20 and extend upwardly over suspending sheaves 22 of companion upright posts and thence downwardly and under longitudinally arranged guide sheaves journaled vertically spaced below the sheaves 22 on the guide frame of the elevator. The cables 30 thence extend horizontally across the guide frame and extend around guide sheaves 31 on the guide frame and sheaves 32 on the fixed head 27 of the ram, thence up and over sheaves 25 on the movable ram head 26, and they are fastened at 29 to the fixed ram head 27.

The vertically movable head 26, with its sheaves 25, is mounted on the free upper end of a piston rod or plunger 33 that is reciprocable in the cylinder of the fluid pressure motor or ram 28, and as the head 26 is lifted the elevator is raised by action of the duplex pairs of cables 20 and 30, while a reduction in fluid pressure in the ram permits lowering of the elevator.

For locking or latching the elevator at a desired level, a pedal controlled system of four safety latches or slide bolts carried by the elevator coact with sets of complementary keepers, stops, or lugs that are rigidly mounted on the standards 15 at the several levels of the guide frame.

Each of the four posts 15, at the levels, is equipped with a horizontally projecting stop as 34 welded thereto, and for coaction with these stops or supporting lugs the elevator is equipped with four spring pressed latch bolts or slide bolts 35, each provided with a rounded nose or cam 36 which contacts with a stop as the elevator ascends to permit the bolts to snap past the stops. The bolts are mounted in housings as 37, and springs 38 within the housings constantly tend to project the bolts into locking position or engagement with the stops for supporting the elevator at a selected level of the storage structure.

A duplex pedal control mechanism for the bolts is operated by the attendant standing on the elevator, for retracting the bolts and thus releasing the elevator for a descending movement. The pedal 39 is mounted on a rock shaft 40 journaled in the elevator, and the shaft actuates duplex devices including toggle links 41 and 42, the latter pivoted by pin 43 on the latch bolt, which pin is slidable in a slot 43' of the housing 37. The lower arm of a rocking lever 44 is flexibly pivoted on the pin 43, and this lever is fulcrumed at 45 on the housing with the end of its upper arm pivoted at 46 to one end of a connecting rod or link 47, and the other end of this long link is pivoted at 48 on a pin that is rigid with another bolt and also projects through a slot 48' in the housing.

After having been run on the elevator, at the entrance to the storage structure, the vehicle to be stored is lifted by the elevator to the desired level and jacked up under fluid pressure by the transfer carrier which is mounted on the elevator, and then the cable operated carrier and vehicle are projected by the extensible jack into a selected compartment and deposited on the parallel runways, after which operation the carrier is retracted to normal position on the elevator.

For removing or withdrawing a vehicle from a compartment, the transfer carrier is run in under the vehicle, the vehicle is jacked up from the runways, the carrier with the vehicle is pulled onto the elevator by the reverse operation of the transfer carrier, and then the vehicle is lowered by the jack to the floor of the elevator, to be discharged therefrom at the ground level.

To accommodate the transfer carrier the floor of the elevator is equipped with a pair of spaced parallel channel rails 49 that extend transversely of the railway track of the motor conveyor, and centrally of the rails 49 a slide housing or tubular drag bar 50 is mounted and adapted to be projected longitudinally in either direction from the sides of the elevator, and also to be retracted in either direction toward the elevator.

The transfer carrier is of oblong shape and it includes a pair of spaced parallel horizontally disposed I-beams 51 united by cross braces 52, and the ends of these I-beams are forked or bifurcated to accommodate rollers 53 journaled in the respective ends. In initial or normal position of the transfer carrier the rollers support the carrier on the track rails 49 of the elevator, and by dotted lines in Fig. 1 it will be seen that the rollers are also adapted to roll along the runways 1 and 2 of the storage compartments for the vehicles.

A vertically reciprocable and rectangular jack-frame 54 made up of inverted channel bars is mounted over the carrier and supported by four pneumatic or fluid pressure operated jacks as 55, each having telescopic pistons or plunger bars 56 to the upper ends of which bars the jack-frame is rigidly attached. For operating the jacks the elevator is equipped with an electric motor 57 which drives an air compressor or pump 58 from which an air hose 59 is extended and connected to duplex pipe lines 60, 60, of the jack frame leading to the four corner jacks, and the supply of motive fluid to the jacks is manually controlled by valve operating mechanism 61 readily accessible to the standing attendant of the elevator.

The motor operated compressor 58 also supplies motive fluid to any adjoining air-motor 62 which operates a winch or rotary drum 63 about which is wrapped duplex cables 64 and 65 that reciprocate the transfer carrier.

Cable 65 extends beneath the elevator and around spaced guide sheaves 66 and 66b to one end of an extension slide or housing 50, operating across the top of the elevator, where the cable is attached at 68; and cable 64 extends around sheaves 66, 66a and thence to the right hand end of the extension slide 50 where it is anchored at 69. As the winch is turned, and by this arrangement of the cables, the extension slide may be reciprocated transversely of the elevator a selected distance as between points 66a and 69. After the extension slide has been projected to operative position, the cable operated transfer carrier in coaction with the extended slide is projected to transfer a vehicle to the runways of the selected storage compartment.

This reciprocation of the carrier is attained through the use of looped duplex cables having their respective ends anchored to the elevator and to the ends of the jack-frame or carrier 54. Cable 70 is attached at one end 71 to the left end of the carrier and it extends a vehicle-length to and around a sheave 72 journaled at the right end of the slide 50, thence the cable returns the full length of the carrier and is anchored at 73 to the elevator. The duplex cable 74 is anchored at 75 to the right end of the carrier and passes around a sheave 76 mounted in the left end of the slide 50, and then the return stretch is anchored at 77 to the elevator.

Thus, the slide is initially projected to compensate for lost motion of the carrier between the elevator and the storage compartment.

An electric motor 78 is mounted at the front end of the wheeled conveyor or motor truck, for operating the pump or compressor 79 that is connected by lines 80 to the air motor 12 which drives the propulsion mechanism for the conveyor, and the motor may be manually controlled in suitable manner as at 81 by the riding attendant. A second compressor 82 is activated by this motor to supply fluid pressure through pipe 83 to the ram 28 that operates the control cables of the elevator.

Upright guide rails 84 are provided for stabilizing the movements of the ram's head 26, and a screen barrier or fence 85 is provided on the elevator for safety of the attendant. Other necessary control equipment is provided, including valve devices for the discharge of motive fluid from the compressors or pumps 79 and 82, which devices are available at the different levels of the elevator. These are controlled by upright rods or rotary valve stems 86 and 87 mounted at their lower ends adjacent the compressors and journaled at their upper ends in a bearing frame 88, and the controls for the valves are always readily accessible to the attendant on the elevator.

Having thus fully described our invention, what we claim as new and desire to secure by Letters Patent is:

1. In a parking apparatus, an elevator, rails mounted upon said elevator transversely thereof and having upstanding side flanges, a carriage having side bars consisting of I-beams disposed horizontally with their flanges along opposite side edges, bracing bars extending between said side bars and spacing the side bars from each other a distance for disposing the side bars over said rails, said side bars being formed with openings, rollers rotatably mounted through said openings and resting upon said rails, a jack frame over said carriage having side bars disposed over the side bars of the carriage and depending side flanges overlapping outer side faces of the flanges of the side bars of the carriage, the jack frame holding its side bars over the side bars of the carriage, jacks mounted upon the side bars of said carriage near ends thereof and having plungers shiftable vertically for exerting upward pressure upon the side bars of the jack frame and supporting the jack frame in a raised position, and means for moving said carriage along said rails.

2. In a parking apparatus, an elevator, rails mounted upon said elevator transversely thereof, a carriage having side bars disposed over said rails and carrying rollers resting upon the bails, a jack frame over said carriage having side bars disposed over the side bars of the carriage and formed with depending flanges overlapping side faces of the side bars of the carriage, jacks mounted upon the side bars of said carriage and having plungers engaging side bars of the jack frame and shiftable upwardly to raise the jack frame, a drag bar mounted upon said elevator between and parallel to said rails and having an upper longitudinally extending slot, pulleys adjacent ends of the said drag bar, a center bar for said carriage disposed between and parallel to its side bars and having depending side flanges overlapping opposite side faces of said drag bar, pulleys carried by said center bar and spaced from ends thereof, a motor upon said elevator, a drum carried by said motor, and cables wound in opposite directions upon said drum and trained about the pulleys and serving to move the carriage along said rails when the drum is rotated.

3. In a parking apparatus, a tiered storage structure having transversely extending stalls at each level in side by side relation to each other, tracks extending longitudinally in a direction transversely of the open ends of said stalls, a wheeled guide frame having upright posts at its corners and supported on said tracks, suspending sheaves journaled at the tops of the corner posts, a transversely disposed elevator movable vertically in said frame, cables secured to the elevator and trained over said sheaves, means including a fluid pressure ram carried by said frame and for operating said cables to raise and lower said elevator, a carriage movable longitudinally of said elevator to an extended position in which the carriage moves off of said elevator into a selected stall, a vertically shiftable jack frame on said carriage engageable under a vehicle longitudinally thereof, means carried by said carriage for shifting the jack frame to selectively support or deposit a vehicle, a drag bar on the elevator and movable longitudinally thereof, said drag bar being positioned parallel with said carriage, pulleys journaled one adjacent each end of said drag bar, a cable having an end secured at one end of said elevator and the other end secured to the corresponding end of said carriage and being trained about the pulley at the opposite end of the drag bar from the first mentioned ends, a second cable secured at its ends to the corresponding ends of said elevator and carriage opposed to the first mentioned ends and being trained about the other pulley, and mechanism for shifting said drag bar longitudinally of the elevator whereby said carriage is movable on and off of said elevator.

4. The structure of claim 3 wherein the tiers of stalls are arranged at opposite sides of the tracks, the elevator being open at opposite sides and the carriage being movable longitudinally of the elevator from either side thereof for depositing vehicles in stalls at predetermined sides of the track.

5. In a parking apparatus, a tiered storage structure having transversely extending stalls at each level in side by side relation to each other, a guide frame movable longitudinally of said structure across open ends of said structure and having upright guide posts, an elevator disposed transversely of the structure and movable vertically in said frame to selected levels of said structure, a carriage on the elevator longitudinally shiftable into and out of said stalls, a vertically shiftable jack frame on said carriage engageable under a vehicle longitudinally thereof, means carried by said carriage for shifting the jack frame to selectively support or deposit a vehicle, a drag bar on the elevator shiftable longitudinally thereof, pulleys journaled one adjacent each end of said drag bar, a cable having an end secured at one end of said elevator and the opposite end secured to the corresponding end of said carriage and being trained about the pulley at the opposite end of the drag bar, a second cable secured at its ends to the corresponding ends of said elevator and carriage opposed to their first mentioned ends and being trained about the other pulley, *and power means for shifting said drag bar* [a power driven winch, and a cable having its central portion wound about said winch and its ends secured at the opposed ends of said drag bar whereby said drag bar may be shifted] longitudinally, to move said carriage on and off of said elevator.

*6. In a parking apparatus, a tiered storage structure having transversely extending stalls at each level in side by side relation to each other; a guide frame movable longitudinally of said structure across open ends of said structure and having upright guide posts; an elevator disposed transversely of the structure and movable vertically in said frame to selected levels of said structure; a carriage on the elevator longitudinally shiftable into and out of said stalls and under a vehicle; means carried by said carriage for selectively lifting and lowering a vehicle, a drag bar on the elevator shiftable longitudinally thereof; pulleys journaled one adjacent each end of said drag bar; a cable having an end secured at one end of said elevator and the opposite end secured to the corresponding end of said carriage and being trained about the pulley at the opposite end of the drag bar; a second cable secured at its ends to the corresponding ends of said elevator and carriage opposed to their first mentioned ends and being trained about the other pulley; and power means for shifting said drag bar longitudinally, to move said carriage on and off of said elevator.*

*7. A vehicle parking device comprising a movable guide frame having upright guide posts; an elevator having a longitudinal dimension and movable vertically in said frame to selected levels; an elongated carriage on the elevator longitudinally shiftable thereof on and off of said elevator; a vertically shiftable jack frame on said carriage engageable under a vehicle longitudinally thereof; means carried by said carriage for shifting the jack frame to selectively support or deposit a vehicle; a drag bar on the elevator shiftable longitudinally thereof; pulleys journaled one adjacent each end of said drag bar: a cable having an end secured at one end of said elevator and the opposite end secured to the corresponding end of said carriage and being trained about the pulley at the opposite end of the drag bar; a second cable secured at its ends to the corresponding ends of said elevator and carriage opposed to their first mentioned ends and being trained about the other pulley; and power means for shifting said drag bar longitudinally, to move said carriage on and off of said elevator.*

References Cited in the file of this patent or the original patent

UNITED STATES PATENTS

| | | |
|---|---|---|
| 1,509,375 | Nolan | Sept. 23, 1924 |
| 1,844,873 | Smith, Sr. | Feb. 9, 1932 |
| 2,120,751 | Jenny | June 14, 1938 |
| 2,428,856 | Sinclair | Oct. 14, 1947 |
| 2,647,647 | Alimanestiano | Aug. 4, 1953 |

FOREIGN PATENTS

| | | |
|---|---|---|
| 337,726 | Great Britain | Oct. 28, 1930 |